(12) United States Patent
Diekhaus

(10) Patent No.: US 10,058,109 B2
(45) Date of Patent: Aug. 28, 2018

(54) CARAMEL PRECURSORS WITH SPECIFIC THICKENING CHARACTERISTICS

(71) Applicant: DMK Deutsches Milchkontor GmbH, Zeven (DE)

(72) Inventor: Martin Diekhaus, Holdorf (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 70 days.

(21) Appl. No.: 14/755,379

(22) Filed: Jun. 30, 2015

(65) Prior Publication Data

US 2016/0000112 A1    Jan. 7, 2016

(30) Foreign Application Priority Data

Jul. 1, 2014 (EP) .................................... 14175328

(51) Int. Cl.
| | |
|---|---|
| *A23G 1/40* | (2006.01) |
| *A23G 1/46* | (2006.01) |
| *A23G 3/32* | (2006.01) |
| *A23G 3/42* | (2006.01) |
| *A23G 3/46* | (2006.01) |
| *A23G 3/34* | (2006.01) |
| *A23G 1/00* | (2006.01) |
| *A23G 1/56* | (2006.01) |
| *A23G 1/30* | (2006.01) |

(52) U.S. Cl.
CPC .......... *A23G 3/0014* (2013.01); *A23G 1/0009* (2013.01); *A23G 1/40* (2013.01); *A23G 1/46* (2013.01); *A23G 3/42* (2013.01); *A23G 3/46* (2013.01); *A23G 1/305* (2013.01); *A23G 1/56* (2013.01); *A23G 3/343* (2013.01)

(58) Field of Classification Search
CPC .......... A23G 9/005; A23G 1/46; A23G 1/009; A23G 3/43; A23G 3/46; A23G 1/40
See application file for complete search history.

(56) References Cited

U.S. PATENT DOCUMENTS

| | | | |
|---|---|---|---|
| 4,871,570 A | 10/1989 | Bohren et al. | |
| 5,591,474 A | 1/1997 | Miller | |
| 6,261,627 B1 * | 7/2001 | Armstrong | A23G 1/047 426/584 |

OTHER PUBLICATIONS

Gorak Distillation: Operation and Applications p. 372 Academic Press Jul. 16, 2014.*
Arbuckle, Ice Cream 2nd Edition the AVI Publishing Group 1973, p. 69.*
Minifie, "The Manufacture of Crumb Milk Chocolate and other methods of Incorporation of Milk in Chocolate," The Manufacturing Confectioner for Apr. 1974, vol. 54, No. 4, Apr. 1, 1974, pp. 19-26.

* cited by examiner

*Primary Examiner* — Kelly Bekker
(74) *Attorney, Agent, or Firm* — Dilworth & Barrese, LLP

(57) ABSTRACT

Caramel precursors and chocolate-containing caramel precursors which have a low viscosity and are easy to dispense, pump and meter, but which thicken up on boiling in such a way that resulting caramels or chocolate-containing caramels are of sufficiently high viscosity, and also a method for their manufacture.

11 Claims, No Drawings

CARAMEL PRECURSORS WITH SPECIFIC THICKENING CHARACTERISTICS

FIELD OF THE INVENTION

The invention is located within the field of food technology and relates to caramel precursors and chocolate-containing caramel precursors having improved thickening characteristics, to a method for their manufacture and to the use of such caramel precursors.

PRIOR ART

Caramelization is among the non-enzymatic browning reactions.

For the traditional production of caramel, table sugar (sucrose) is heated dry in a pan at high heat with continuous stirring. When the sugar begins to melt, it takes only a few seconds for the caramel to take on a dark colour. So that the mass does not subsequently solidify, it is quenched with boiling water when the desired degree of browning has been reached, and is dissolved to form a syrup.

Table sugar begins to melt at about 135° C., as yet without discolouring. The "weak brittle" produced is used in cake- and pastry-making for glazed fruits, spun sugar and sugar decorations. Caramelizing proper, which changes colour and flavour, begins at temperatures of around 150° C.; golden brown caramel, or "strong brittle", requires temperatures of 180 to 200° C. When cooled, caramel is translucent and has a glass-like, brittle-hard consistency. The different colours of caramel are achieved by factors including temperature change (the hotter, the blacker) and substances added during heating, e.g. sulphite or ammonium carbonate.

Sugars such as glucose, fructose and sucrose change their chemical composition dramatically when heated. Caramel in fact only contains about 10% sugar, with all of the other components forming newly. Thus, recently, modern techniques of mass spectrometry have shown that at least 4000 different reaction products are formed in the process (*J. Agric Food Chem.*, 2012, 60 (12), pages 3266-3274). The sugar becomes dewatered, and various oligomers of sugar are formed, as well as products of water elimination, with some of these being responsible for the brown coloration and the bitter flavour. The darker it is burned, therefore, the sharper the flavour of the caramel.

Food manufacturers nowadays utilize computer-controlled caramel manufacturing lines which ensure consistent quality. Whether in liquid, solid or paste form, and whether as a filling, coating, flavouring, colouring, or main constituent of foods, caramel has been very popular for centuries. Around 80% of coloured foods have caramel added. Known examples are cola, whisky, beer, soy sauce and biscuits. Furthermore, caramel cream is also used as a coating mass in chocolate bars, chocolates or as a bonbon filling.

The problem in the manufacture both of caramel products and of chocolate-containing caramel products is that caramel, as it cools, becomes extremely viscous and sticky. This high viscosity can lead to problems affecting the pumps of the coating systems and pouring lines which are employed in the industrial manufacture of such products, meaning that the precise metering required in standardized industrial manufacturing operations is very difficult to achieve.

The deposition of foods, especially of shaped confectionery products such as chocolate with a viscous confectionery filling, such as caramel, for example, poses a great technical problem. The manufacture of such products normally includes a step of deposition into a mould, in order to produce the desired shape for the end product. This process includes the step of the filling of a mould by injecting of a measured amount of a liquid caramel or liquid chocolate by means of a piston through a nozzle into the mould. This is followed by the cooling or drying of the deposited mass, until the setting of the finished product has been correctly achieved.

However, the abovementioned deposition process for high-viscosity confectioneries suffers from various disadvantages. One of the main difficulties affecting caramel creams and chocolate creams is the separating of the material of one deposited section from the material which remains in the deposition nozzle. The material tends to stretch out in a tail that does not easily collapse under its own weight and the effect of gravity. This phenomenon is known as the "tailing" problem. This defect may consequently affect the accuracy of metering, the weight and the shape of the final shaped product. After the filling operation, numerous strings are formed across the moulds, and are not hygienic and so need to be removed by cleaning. Tailing is also unacceptable for aesthetic reasons and may cause major quality defects. These defects may lead to difficulties in the packaging and wrapping of the product. If, for example, caramel is deposited into a chocolate product in shell form, the tail may cause a channel through the chocolate shell and may adhere to the packaging. Tailing may also cause clogging of the nozzle or the blocking of moving parts of the deposition equipment. Moreover, the viscosity of the caramel changes very rapidly with temperature, and this means that caramel must be added as hot as possible, to make it flow easily, and yet not so hot that it melts the chocolate shell.

On the other hand, if the caramel creams or chocolate-containing caramel creams are prepared with a relatively low viscosity, in order to prevent the problems identified above, the caramelized products in the mass become so soft that the caramel drips from the end products manufactured (e.g. biscuit bars), and this poses a great problem not least for compliance with the strict hygiene protocols to which the food industry is subject.

There are various options known from the prior art in order to overcome the problems outlined above.

GB 2 026 378 relates to apparatus for reducing tailing when depositing high-viscosity confectioneries, which at the time of the separation of the confectionery mass expels a pulse of steam or compressed air through the nozzle.

EP 1 064 852 B1 and DE 601 19 977 T2 describe a method for manufacturing shaped chocolate products having a viscous filling such as caramel. The method involves exerting pressure on the food mass by a pressure means at a velocity which accelerates during the stroke of the pressure means, the passage of the food mass through a nozzle outlet portion of reduced diameter, and the stopping of the discharge of the food mass by means of a valve which operates with a cut-off motion of at least 400 mm/s.

These methods in the prior art have the disadvantage, however, that they require the acquisition of specific and complicated apparatus or parts of apparatus, leading to an additional technological complexity and, consequently, to a considerable increase in the economic costs of the operation.

Within the field of food technology, therefore, there is a great need for caramel precursors and chocolate-containing caramel precursors which after the appropriate boiling in the preparation and manufacture of the confectionery end-products are free from the disadvantages outlined above, and which can be manufactured using a standard line, without requiring the installation of specific and complicated apparatus.

The object of the present invention, therefore, was that of providing caramel precursors and chocolate-containing caramel precursors which have a low viscosity and can be easily dispensed, pumped and metered, but which thicken up on boiling in such a way that the resulting caramels and chocolate-containing caramels are of sufficiently high viscosity.

A second object of the present invention, accordingly, was to provide caramel precursors and chocolate-containing caramel precursors which after boiling exhibit thickening characteristics, so that the dripping from the end products, after they have been coated in the coating systems and pouring lines with the caramel or chocolate-containing caramel resulting from such caramel precursors, is reduced or does not take place.

A third object of the present invention, therefore, was to provide confectionery products having a viscous filling or a viscous coating mass, preferably caramel or a chocolate-containing caramel, which can be manufactured without any significant tailing problem.

A fourth object of the present invention, therefore, was to provide confectionery products having a viscous filling or a viscous coating mass, preferably caramel or a chocolate-containing caramel, which can be disposed within a single pack without the products sticking to one another, thereby reducing the amount of packaging material required.

DESCRIPTION OF THE INVENTION

The invention provides caramel precursors and chocolate-containing caramel precursors having improved thickening characteristics, obtainable by
i) preparing a mixture of a dairy and/or cocoa product (component a) and sugar (component b),
ii) subjecting the product obtained in step i) to a temperature treatment below 140° C., at which caramelization occurs,
iii) subjecting the caramelized product obtained in step ii) to a concentration step under a temperature gradient,
iv) subjecting the concentrate obtained in step iii) to a first cooling,
v) seeding the product obtained in step iv) with carbohydrate crystals,
vi) subjecting the seeded product obtained in step v) to a second cooling, and finally
vii) dispensing the product obtained in step vi).

The invention secondly provides a method for manufacturing caramel precursors and chocolate-containing caramel precursors having improved thickening characteristics, by
i) preparing a mixture of a dairy and/or cocoa product (component a) and sugar (component b),
ii) subjecting the product obtained in step i) to a temperature treatment below 140° C., at which caramelization occurs,
iii) subjecting the caramelized product obtained in step ii) to a concentration step under a temperature gradient,
iv) subjecting the concentrate obtained in step iii) to a first cooling,
v) seeding the product obtained in step iv) with carbohydrate crystals,
vi) subjecting the seeded product obtained in step v) to a second cooling, and finally
vii) dispensing the product obtained in step vi).

The invention thirdly provides caramel precursors and chocolate-containing caramel precursors having a β-lactoglobulin content of at least 1500 mg/L, and methods for preparing them.

Surprisingly it has been found that the combination of the individual operating steps, particularly the implementation below 140° C. of a very gentle caramelization step, leads to caramel precursors and chocolate-containing caramel precursors in which the amount of β-lactoglobulin is at least 1500 mg/L.

It has surprisingly been found, furthermore, that caramel precursors and chocolate-containing caramel precursors of these kinds have a sufficiently low viscosity allowing them to be easily dispensed, pumped and metered, but thicken up on boiling in such a way that the resulting caramels and chocolate-containing caramels are of sufficiently high viscosity that dripping from the end products, and also the problem of tailing and the sticking of the end products to one another, are reduced or do not occur.

The caramel precursors of the present invention consist substantially of milk protein, sugar, syrup, fat and water.

A multiplicity of types of sugar are suitable for caramelization in the present invention.

Sugar itself is a carbohydrate. It is a collective term for all sweet-tasting sugars and at the same time the trade name of the disaccharide sucrose.

In its natural form, sugar is crystalline and appears white as a result of refraction of light. Sugar is formed by all green plants through photosynthesis from solar energy and carbon dioxide. Pure sugar forms in nature are sucrose, glucose (grape sugar), fructose, galactose and maltose. Principal sources of sugar harvesting are sugar palm (palm sugar), sugar beet (beet sugar) and sugar cane (cane sugar).

The types of sugar which may be used according to the present invention include all sprinklable sugars which are present in powdered, fine-, medium- or coarse-grain crystalline form or else in solution in a slightly viscous form.

Independently of the type of sugar, varieties of sugar include the following examples:
refined or table sugar, powdered sugar, brown sugar, icing sugar, granulated sugar, coarse sugar, quick-dissolving sugar, silk sugar, sugar candy, brown cane sugar, cane sugar, raw cane sugar, whole cane sugar, palm sugar, caster sugar
sugar mixtures: vanilla sugar, vanillin sugar, syrups (e.g. maple syrup, beet syrup, concentrated pear juice, concentrated apple juice), spiced sugars (e.g. sugar with cinnamon, almond or cardamom)
other sugars and sugar substitutes: sucrose/saccharose, trehalose, lactose, maltose, melezitose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde, maltodextrin or invert sugar. Likewise suitable are plant preparations comprising these compounds, examples being those based on sugar beet (*Beta vulgaris* ssp., sugar fractions, sugar syrup, molasses), sugar cane (*Saccharum officinarum* ssp., molasses, sugar cane syrup), maple syrup (*Acer* ssp.) or agaves (concentrated agave juice).

"Syrup" is a viscous, concentrated solution of a sugar or sugar substitute that is obtained by boiling or other techniques, in particular by enzymatic cleavage processes, from sugar-containing liquids such as sugar water, sugar substitute-containing liquids, sugar beet juice, fruit juices or plant extracts. As a result of its high sugar content, it has a long storage life even without cooling.

In one preferred embodiment, the caramel precursors and cocoa/chocolate containing caramel precursors comprise a syrup selected from the group consisting of hexose syrup, glucose syrup, fructose syrup or maltitol syrup.

A "hexose syrup" in the context of the present invention is a syrup which comprise hexose sugars (mono- or polysaccharides) as its principal constituent. Preferably it comprises glucose syrup or fructose syrup, or a mixture of these two syrups. Glucose syrup is especially preferred. If the base material of the invention is to be suitable for a dietetic food, the syrup preferably comprises maltitol syrup or isomalt syrup.

"Glucose syrup" is a thickened solution which is obtained from starch by enzymatic splitting and which comprises a mixture of different mono- and polysaccharides. One of the main constituents is glucose (grape sugar). Besides glucose as monosaccharide, glucose syrup also commonly includes high proportions of maltose, maltotriose and oligosaccharides (e.g. Grafschafter glucose syrup 43° or 45°). In industrial food production, glucose syrup is used primarily to sweeten meals and beverages. This syrup is therefore one of the most important products of the starch industry. As a result of the enzymatic splitting of the starch, sweet sugars may be obtained not only from sugar cane and sugar beet, but also from more economical plants such as maize, potatoes and wheat, something which nowadays takes place on an industrial scale in the operation of the saccharification of starch. Many foods, such as bonbons, for example, cannot be produced with addition of glucose syrup. The reason is that glucose syrup prevents the crystallization of beet sugar (sucrose) in the manufacture of hard caramels, prolongs the retention of freshness of soft caramels, fondant, gum and foam sugar products, is an ingredient of alcohol-free beverages, liqueurs, ice-cream, jams and fruit jellies, is used as a sweetener and browning agent for bakery goods, and is included in muesli, salad creams and fruit powders. Glucose syrup has a neutral to sweet taste and is readily soluble in water.

"Fructose syrup" is a clear, pale syrup with an unpleasantly intense sweet taste and with a sugar fraction (generally 70 wt %) made up to an extent of at least 90%, usually at least 95%, of fructose (remainder: generally glucose).

"Maltitol syrup" (E 965 (ii)) consists of maltitol, sorbitol and hydrogenated glucose syrup. Isomalt syrup consists of isomalt (E 953) and water and is typically produced by boiling of isomalt in water. Both types of syrup are sugar substitutes (food sweeteners) and are used for producing dietetic foods or feeds. Maltitol syrup serves in particular as a food additive for juices, marzipan and chewing gum. Isomalt finds preferential use in desserts, ice-cream and confectionery.

For the purposes of this invention, the term "milk" encompasses all cow's milk varieties as understood in food law, with their customary commercial fat contents: whole milk, skimmed milk, fat-reduced milk, whey, condensed milk or cream, and also the various treatment technologies that are employed: pasteurizing, sterilizing, ultra-high heating, and homogenization.

The term "chocolate" is intended to denote all chocolate compositions or chocolate-like compositions having a fatty phase or fat-like phase. The term includes all chocolate and chocolate-like compositions which comprise at least one cocoa component or cocoa-like component in the fat-like phase. The term is intended to include, for example, standardized and non-standardized chocolates, i.e. including chocolates with compositions which conform to the U.S. Standards of Identity (SOI) and compositions which do not conform to the SOI, including dark chocolate, cooking chocolate, milk chocolate, sweet chocolate, semi-sweet chocolate, buttermilk chocolate, skimmed milk chocolate, chocolate comprising mixed dairy products, chocolate with low fat content, white chocolate, non-standardized chocolates, coatings and chocolate-like compositions, unless specifically identified otherwise.

The fatty phase of the chocolate in the present invention may include cocoa butter, milk fat, hydrogenated or partially hydrogenated vegetable oils or fat (fractionated or non-fractionated), water-free milk fat, butter oil and other fats or mixtures of cocoa butter with these other fat-like compositions. See, "*Minifie, Chocolate, Cocoa and Confectionery: Science and Technology*", $3^{rd}$ edition. The fatty phase may include fat systems which are non-tempering or non-contracting or both.

Chocolates also include those which comprise crumb solids or solids produced wholly or partly by a crumb process.

Non-standardized chocolates are obtained if nutritional carbohydrate sweeteners are wholly or partly replaced; or if the cocoa butter or the milk fat is wholly or partly replaced; or if components which have flavour properties imitating milk, butter or chocolate are added, or other additions or omissions are made in the formula outside of the USFDA Standards of Identity for chocolate, or combinations thereof.

The term "chocolate-like compositions" identifies compositions with chocolate flavour which comprise particulate solids in dispersion in a fatty or fat-like phase.

The term "tempering" refers to the presence of stable fat crystals in a chocolate. The degree or level of tempering of the chocolate can be measured using instruments available commercially, which characterize the behaviour in a chocolate sample during controlled cooling.

One example of this kind of instrument is the Tricor temper meter [Tricor instruments, Elgin, Ill.], which in a standard embodiment determines chocolate tempering during a 5-minute controlled cooling test. The temper meter determines and measures an inflection point in a temperature/time curve. The tempering units can be expressed as chocolate tempering units (CTU) and/or as a slope measurement. CTU measurements can be expressed on either Fahrenheit or Celsius temperature scales. All CTU measurements referred to herein are on the Fahrenheit scale, unless otherwise specified. Fahrenheit CTU measurements can be converted into Celsius measurements by dividing by a factor of 1.8. Higher CTU values and lower slope values correspond to higher levels of tempering.

The term "fats" as used herein denotes triglycerides, diglycerides and monoglycerides or other fat-like materials which can normally be used in fat-based confectioneries, including chocolates and chocolate-like products. Fats include the naturally occurring fats and oils, such as cocoa butter, pressed cocoa butter, expeller cocoa butter, solvent-extracted cocoa butter, refined cocoa butter, milk fat, water-free milk fat, fractionated milk fat, milk fat substitutes, butter fat, fractionated butter fat, fats (fractionated or non-fractionated), vegetable fats, modified vegetable fats and synthetically modified fats, such as caprenin.

The caramel precursors and chocolate-containing caramel precursors of the present invention also include other ingredients, examples being thickeners and emulsifiers.

Thickeners are substances which are primarily able to bind water. Through removal of unbound water, there is an increase in the viscosity. Starting at a concentration which is characteristic for each thickener, this effect is supplemented by network effects which lead to a usually disproportionate increase in the viscosity. Molecules are said in this case to 'communicate' with one another, i.e. to become entangled. The majority of thickeners are linear or branched macromolecules (e.g. polysaccharides or proteins), which are able to interact with one another through intermolecular interactions, such as hydrogen bonds, hydrophobic interactions or ionic relationships. Extreme cases of thickeners are phyllosilicates (bentonites, hectorites) or hydrated $SiO_2$ particles which are present in the form of dispersed particles and are able to bind water in their solid-like structure and/or are able to interact with one another on the basis of the interactions described. Examples are:

E400—alginic acid
E401—sodium alginate
E402—potassium alginate
E403—ammonium alginate
E404—calcium alginate
E405—propylene glycol alginate
E406—agar agar
E407—carrageenan, furcelleran
E408—carob bean meal
E412—guar kernel meal
E413—tragacanth
E414—gum arabic
E415—xanthan
E416—karaya (Indian tragacanth)
E417—tara gum meal (Peruvian carob bean meal)
E418—gellan
E440—pectin, Opekta
E440ii—amidated pectin
E460—microcrystalline cellulose, cellulose powder
E461—methylcellusose
E462—ethylcellulose
E463—hydroxypropylcellulose
E465—methylethylcellulose
E466—carboxymethylcellulose, sodium carboxymethylcellulose Emulsifiers are distinguished by the important property of being soluble both in water and in fat. Emulsifiers usually consist of a fat-soluble part and a water-soluble part. They are always employed when water and oil are to be brought into a stable state of homogeneous mixing. Suitable emulsifiers which are used in the food-processing industry are selected from the following: ascorbyl palmitate (E 304), lecithin (E 322), phosphoric acid (E 338), sodium phosphate (E 339), calcium phosphate (E 341), magnesium orthophosphate (E 343), propylene glycol alginate (E 405), polyoxyethylene(8) stearate (E 430), polyoxyethylene stearate (E 431), ammonium phosphatides (E 442), sodium phosphate and potassium phosphate (E 450), sodium salts of edible fatty acids (E 470 a), mono- and diglycerides of edible fatty acids (E 471), acetic acid monoglycerides (E 472 a), lactic acid monoglycerides (E 472 b), citric acid monoglycerides (E 472 c), tartaric acid monoglycerides (E 472 d), diacetyltartaric acid monoglycerides (E 472 e), sugar esters of edible fatty acids (E 473), sugar glycerides (E 474), polyglycerides of edible fatty acids (E 475), polyglycerol polyricinoleate (E 476), propylene glycol esters of edible fatty acids (E 477), sodium stearoyllactylate (E 481), calcium stearoyl-2-lactylate (E 482), stearyl tartrate (E 483), sorbitan monostearate (E 491), stearic acid (E 570).

For the preparation of the caramel precursors and chocolate-containing caramel precursors, the first step—step i) of the method—is that of mixing a milk and/or cocoa product (component a) and sugar (component b). This step normally takes place in a rotary boiler. Components of these kinds are sufficiently well known from the prior art.

Components a and b are mixed in a stirring apparatus preferably in a weight ratio of about 40:60 to about 60:40 and more particularly about 50:50, to give a preparation which has a dry mass of about 25 to about 40 wt % and more particularly of about 30 to about 35 wt %.

Thereafter the mixture obtained is caramelized under very mild conditions—step ii)—and subsequently the resulting concentrate is fed into an evaporator, preferably a falling stream evaporator—step iii)—and gently dewatered.

The amount of β-lactoglobulin in the caramel precursors and chocolate-containing caramel precursors of the invention prove to be critically important in allowing the manufacture of caramels and chocolate-containing caramels having the desired thickening characteristics.

β-Lactoglobulin is the whey protein component which remains in whey following casein precipitation at a pH of 4.6 and at room temperature (20° C.). With an average content of 3.5 g/L milk, β-lactoglobulin forms the principal component of the whey protein mixture. It is present primarily in the form of a dispersion (in molecular form).

Because of the high proportion of essential α-amino acids—especially lysine—β-lactoglobulin is very important from the standpoint of nutritional physiology. The basic amino acid lysine plays an important part as a carnitine precursor and is a component of collagen (in the hydroxylated form). The essential amino acid tryptophan functions as a regulator of protein biosynthesis.

It is involved, moreover, in the formation of niacin and of serotonin. Methionine, which contains sulphur, is the precursor of cysteine and of taurine, and functions as a methyl donor in various biochemical processes. Phenylalanine acts as a precursor in tyrosine synthesis and is involved in the formation of melanin, adrenaline and thyroxine.

The β-lactoglobulin molecule is formed of 162 amino acids and has a molar mass of 18277 g·mol$^{-1}$ (=18.277 kDA as monomer). The globular molecule, which is present as a dimer in milk, has seven genetic variants (A, B, C, D, E, F, G), with variants A and B occurring the most frequently. At a pH of between 5.2 and 7, β-lactoglobulin takes the form of a dimer; at a pH of between 3.5 and 5.2 it is an octamer, and at a pH of 3 and >8 it is a monomer.

The native β-lactoglobulin molecule possesses nine antiparallel folded leaf structures. Of these, eight, together with a three-dimensional α-helix, form what is called a calyx. The latter consists of two strands, with the $1^{st}$ sheet being composed of structures A, B, C and D, with structures E, F, G and H forming the $2^{nd}$ sheet. A highly reactive thiol group is possessed by cysteine 121, which is involved in denaturing of aggregation reactions. The remaining four cysteine residues may lead to the formation of disulphide bridges, two each. The phenyl ring of the Phe 136 separates the Cys 121 from the disulphide bridge which is formed between Cys 106 and 119.

β-Lactoglobulin is involved in vitro in the transport of retinol and fatty acids (long-chains), and also in vitamin D transfer and cholesterol transfer (at a pH of 5). Furthermore, β-lactoglobulin influences the regulation of phosphorus metabolism in the mammary gland. Furthermore, a large part is played by the amino acid composition. β-Lactoglobulin has a high fraction of cysteines, which have an influence in glutathione synthesis.

The digestion of milk fat is promoted by the binding of free fatty acids by the β-lactoglobulin. The whey protein β-lactoglobulin and the retinol binding protein which occurs in the plasma possess a number of genetic similarities. As a result of this, it is assumed that the intestinal uptake of retinol and long-chain fatty acids is promoted by the presence of β-lactoglobulin, in the as yet unborn calf.

Whey proteins differ in their sensitivity towards heat exposure, and may be employed for classifying thermal exposure on the basis of their degree of denaturing. For instance, the instability of the whey protein fraction to heat is as follows: α-lactalbumin<β-lactoglobulin<serum albumin<immunoglobulins.

On heating beyond 70° C., there is denaturing of the whey proteins, leading to a change in structure and, in association therewith, to the formation of different specific features and also a decrease in the solubility—especially β-lactoglobulin. The β-lactoglobulin in its dimeric structure dissociates into a monomer. In the presence of a high calcium ion concentration and a pH>8.6, the denaturing is no longer reversible.

The chemical changes in the two principal whey protein fractions at temperatures of 86°-140° C. can be elucidated by means of reaction kinetics. During denaturing, the globular structure of the whey proteins is unfolded, and complexes are formed within the whey protein fraction, but also with other proteins in the milk, particularly with κ-caseins. Their tendency to undergo denaturing on heating is based on the high level of sulphur-containing α-amino acids present, cysteine and cystine. On thermal exposure, the disulphide bonds are broken, sulphhydryl groups ($H_2S$) are released, and dimethyl sulphide $(CH_3)_2S$ is formed, and is responsible for the cooked flavour (in highly heated milk products).

With increasing temperature and hot holding times, there is an in increase in the degree of denaturing of the whey proteins. If the milk has a high total protein concentration, the rate of denaturing of the whey proteins is likewise increased.

A mount of β-lactoglobulin of at least 1500 mg/L in the caramel precursors and chocolate-containing caramel precursors of the invention has been found to be particularly favourable in order to allow manufacture of end products having the desired thickening characteristics.

In another preferred embodiment, the amount of β-lactoglobulin in the caramel precursors and chocolate-containing caramel precursors is in the region of about 1500 and about 7000 mg/L, preferably about 6000 and 2000 mg/L, and especially preferably of about 3000 and 5000 mg/L.

The amount of β-lactoglobulin can be determined by means of various techniques, examples being HPLC (high performance liquid chromatography), reversed-phase HPLC, SDS-PAGE (sodium dodecyl sulphate polyacrylamide gel electrophoresis) or native PAGE (native polyacrylamide electrophoresis).

These analytical techniques are very well known to the skilled person, who is able to undertake them on the basis of general knowledge, without taking an inventive step.

It has emerged that the technical parameters of the caramelizing step ii) and the subsequent dewatering step—step iii)—are of particular importance for inhibiting the denaturing process of the β-lactoglobulin—which occurs as a result of the heating that is required for caramelization—in the mass, meaning that the caramel precursors or chocolate-containing caramel precursors prepared by means of the method of the invention have sufficient non-denatured β-lactoglobulin that they have still have the required viscosity in a subsequent boiling procedure as part of the manufacturing operations for confectionery.

In one preferred embodiment, the temperature of the caramelization step ii) is in the range from about 95 to about 120° C., preferably 100 to about 115° C., and especially preferably 105 to about 110° C.

In another preferred embodiment, the caramelization temperature in step ii) is not more than 115° C., preferably 110° C., and especially preferably 105° C.

In another preferred embodiment, the temperature gradient during the concentration of step iii) is in the range from about 100 to about 50° C., preferably from about 90 to about 55° C.

It has proven particularly favourable for the inhibition of the denaturing of β-lactoglobulin if the caramelization temperature of step ii) is not more than about 110° C., and the concentration of step iii) takes place under a temperature gradient of about 80 to about 60° C.

The concentrate which is obtained in step iii) but which is still comparable is cooled initially in step iv) to about 30 to about 40° C. At this point the concentrate is oversugared. This means that sugar would begin to separate out, leading to irregularity in the rheological properties of the end product. For this reason, the solution in step v) is seeded with carbohydrate crystals, which shift the solution equilibrium again.

Carbohydrates contemplated here are first and foremost lactose, glucose and maltose. The amount used is about 150 to about 250 g and preferably about 200 g per 1000 kg of concentrate, corresponding to about 0.2 wt %. Subsequently, in step vi), the solution is cooled back down to 20 to about 25° C. and the resulting product is dispensed.

INDUSTRIAL APPLICABILITY

According to the present invention, the caramel precursors and chocolate-containing caramel precursors can be prepared with a β-lactoglobulin content of at least about 1500 mg/L. Caramel precursors and chocolate-containing caramel precursors of this kind have a sufficiently low viscosity to allow them to be readily dispensed, pumped and metered, and yet thicken up on boiling in such a way that the resulting caramels and chocolate-containing caramels have a sufficiently high viscosity that dripping from the end products and also the tailing problem and the sticking-together of the end products are reduced or do not take place.

EXAMPLES

Example 1

A mixture consisting of whole milk and table sugar in a weight ratio of 49:51 with a dry mass of 33 wt % was heated with continuous stirring in a rotary boiler at 125° C. for 4 seconds. The caramelized product obtained was evaporated in a falling stream evaporator, with application of a temperature gradient from 90 to 60° C., down to a dry mass of 75 wt %. The resulting concentrate was cooled to 30° C., then admixed with 0.2 wt % of crystalline lactose and stirred intensely. The caramel precursor obtained was subsequently cooled to 20° C. and dispensed. The β-lactoglobulin content of the resulting end product was 1800 mg/L.

Example 2

A mixture consisting of cocoa powder, whole milk and table sugar in a weight ratio of 49:51 with a dry mass of 40 wt % was heated with continuous stirring in a rotary boiler at 110° C. for 4 seconds. The caramelized product obtained was evaporated in a falling stream evaporator, with application of a temperature gradient from 90 to 60° C., down to a dry mass of 70-80 wt %. The resulting concentrate was cooled to 30° C., then admixed with 0.2 wt % of crystalline lactose and stirred intensely. The caramel precursor obtained was subsequently cooled to 20° C. and dispensed. The β-lactoglobulin content of the resulting end product was 3200 mg/L.

Example 3

A mixture consisting of skimmed milk and table sugar in a weight ratio of 45:55 with a dry mass of 40 wt % was heated with continuous stirring in a rotary boiler at 110° C. for 4 seconds. The caramelized product obtained was evaporated in a falling stream evaporator, with application of a temperature gradient from 90 to 60° C., down to a dry mass of 70-80 wt %. The resulting concentrate was cooled to 30° C., then admixed with 0.2 wt % of crystalline lactose and stirred intensely. The caramel precursor obtained was subsequently cooled to 20° C. and dispensed. The β-lactoglobulin content of the resulting end product was 1650 mg/L.

Comparative Example C1

A mixture consisting of whole milk and table sugar in a weight ratio of 49:51 with a dry mass of 33 wt % was heated with continuous stirring in a rotary boiler at 140° C. for 4 seconds. The caramelized product obtained was evaporated in a falling stream evaporator, with application of a temperature gradient from 90 to 60° C., down to a dry mass of 70-80 wt %. The resulting concentrate was cooled to 30° C., then admixed with 0.2 wt % of crystalline lactose and stirred intensely. The caramel precursor obtained was subsequently cooled to 20° C. and dispensed. The β-lactoglobulin content of the resulting end product was 200 mg/L.

Comparative Example C2

A mixture consisting of whole milk and table sugar in a weight ratio of 49:51 with a dry mass of 33 wt % was heated with continuous stirring in a rotary boiler at 140° C. for 4 seconds. The caramelized product obtained was evaporated in a falling stream evaporator, with application of a temperature gradient from 100 to 60° C., down to a dry mass of 70-80 wt %. The resulting concentrate was cooled to 30° C., then admixed with 0.2 wt % of crystalline lactose and stirred intensely. The caramel precursor obtained was subsequently cooled to 20° C. and dispensed. The β-lactoglobulin content of the resulting end product was 300 mg/L.

Results

The caramel precursors of Examples 1-3 and also Comparative Examples C1-C2 were boiled under similar conditions, and the liquid caramel obtained was used as coating mass or filling material in standardized products. The results are summarized in Table 1.

TABLE 1

| | Performance tests | | |
|---|---|---|---|
| Examples | Dripping | Tailing | Sticking |
| 1 | x | x | x |
| 2 | x | x | x |
| 3 | x | x | x |

TABLE 1-continued

| | Performance tests | | |
|---|---|---|---|
| Examples | Dripping | Tailing | Sticking |
| C1 | ✓ | ✓ | ✓ |
| C2 | ✓ | ✓ | ✓ | x: not observed
✓: observed

The liquid caramels obtained were used as a coating mass for biscuit bars, and the dripping of the caramel from biscuit bars was monitored visually after 30 seconds.

Standard chocolate shells (10 units), at a distance of 10 mm from one another, were filled with the liquid caramels obtained. The tailing and the "sticking to one another" of the adjacent chocolate shells was monitored visually after 30 seconds.

The results in Table 1 show clearly that only those caramels originating from caramel precursors having a β-lactoglobulin content <1500 mg/L exhibit the unwanted effects at the time of their practical application. In contrast, the caramels produced from the caramel precursors of the invention are free from these effects.

The invention claimed is:

1. Caramel precursors and chocolate-containing caramel precursors obtained by the method consisting of:
   i) preparing a mixture consisting of sucrose (component b) and a milk and/or cocoa product (component a),
   ii) subjecting the product obtained in step i) to a temperature treatment in the range from about 100 to about 110° C., at which caramelization occurs,
   iii) subjecting the caramelized product obtained in step ii) to a concentration step under a temperature gradient in the range of from about 100 to about 50° C.,
   iv) subjecting the concentrate obtained in step iii) to a first cooling,
   v) seeding the product obtained in step iv) with carbohydrate crystals,
   vi) subjecting the seeded product obtained in step v) to a second cooling, and finally
   vii) dispensing the product obtained in step vi) to obtain said precursors,
   wherein the caramel precursors and chocolate-containing caramel precursors dispensed in step vii) contain β-lactoglobulin in an amount of at least 1500 ml/L, and
   the caramel precursors and chocolate-containing caramel precursors dispensed in step vii) are fluid, and upon boiling, the viscosity is significantly increased to avoid dripping, tailing and sticking of the boiled precursors.

2. The precursors of claim 1, wherein the milk is whole milk, skimmed milk, fat-reduced milk, whey, condensed milk or cream.

3. A method for manufacturing caramel precursors and chocolate-containing caramel precursors consisting of the steps:
   i) preparing a mixture consisting of sucrose (component b) and a milk and/or cocoa product (component a),
   ii) subjecting the product obtained in step i) to a temperature treatment in the range from about 100 to about 110° C., at which caramelization occurs,
   iii) subjecting the caramelized product obtained in step ii) to a concentration step under a temperature gradient in the range of from about 100 to about 50° C.,
   iv) subjecting the concentrate obtained in step iii) to a first cooling, v) seeding the product obtained in step iv) with carbohydrate crystals, vi) subjecting the seeded product obtained in step v) to a second cooling, and finally vii) dispensing the product obtained in step vi) to obtain said precursors, wherein the caramel precursors and chocolate-containing caramel precursors dispensed in step vii) contain β-lactoglobulin in an amount of at least 1500 ml/L, and the caramel precursors and chocolate-containing caramel precursors dispensed in step vii) are fluid, and upon boiling, the viscosity is significantly increased to avoid dripping, tailing and sticking of the boiled precursors.

4. The method of claim 3, wherein the milk in step i) is whole milk, skimmed milk, whey, cream, fat-reduced milk or condensed milk.

5. The method of claim 3, wherein the mixture of step i) consists of components a) and b) in a weight ratio of about 40:60 to 60:40.

6. The method of claim 3, wherein the mixture of step i) has a dry mass of about 25 to about 40 wt %.

7. The method of claim 3, wherein the temperature gradient ranges from about 100 to about 60° C.

8. The method of claim 3, wherein the concentration of step iii) takes place under a temperature gradient of about 90 to about 60° C.

9. The method of claim 3, wherein the carbohydrate crystals in step v) are selected from the group consisting of lactose, glucose and maltose crystals.

10. The method of claim 3, wherein the first and second cooling (steps iv and vi) are carried out at temperatures in the range from about 30 to about 40° C. and 20 to about 25° C., respectively.

11. The method of claim 3, wherein the milk in step i) is whole milk or skimmed milk.

* * * * *